June 14, 1949.    W. L. RINGLAND    2,473,302
DYNAMOELECTRIC MACHINE HAVING LAMINATED ARMATURE
WITH TEETH SLOTTED TO REDUCE EDDY CURRENTS
Filed June 7, 1946

INVENTOR
William L. Ringland
BY
Didier Journeaux
ATTORNEY

Patented June 14, 1949

2,473,302

UNITED STATES PATENT OFFICE 2,473,302

DYNAMOELECTRIC MACHINE HAVING LAMINATED ARMATURE WITH TEETH SLOTTED TO REDUCE EDDY CURRENTS

William L. Ringland, West Allis, Wis., assignor to Allis-Chalmers Manufacturing Company, Milwaukee, Wis., a corporation of Delaware Application June 7, 1946, Serial No. 674,958

8 Claims. (Cl. 171—252)

1

This invention relates in general to improvements in dynamoelectric machines and more particularly to means for reducing eddy currents produced in armature cores by the fringing flux entering the end surfaces thereof.

Eddy currents produced in the armature core of a dynamoelectric machine by the air gap flux are commonly reduced by transversely dividing the core into insulated laminae having the proper thickness and composition. The fringing flux entering the end surfaces of the core and the end surfaces of core elements defining ventilating ducts however causes eddy currents which are not reduced by transversely laminating the core. In machines where the fringing flux is relatively large, the resulting eddy currents may cause such local heating of limited portions of the core as to damage the adjacent winding insulation. The fringing flux becomes particularly important where the field structure is made appreciably longer than the associated armature core to reduce the flux density in the field structure.

To reduce eddy currents produced by the fringing flux it has been proposed to laminate the end portions of armature cores in the direction of the fringing flux, but such arrangement introduces mechanical complications which render it impractical. It has also been proposed to gradually increase the air gap at the end laminae for the same purpose, but the amount of support given to the laminae is then necessarily reduced.

It has been found that the eddy currents induced by the fringing flux need not be reduced to the same extent as those induced by the air gap flux and may therefore be reduced by less elaborate means. The preferred manner of effecting such reduction resides in providing the affected laminae with narrow radial slots of substantially uniform width extending to the air gap, which slots do not appreciably affect the reluctance of the laminae for the air gap flux. The slots may be extended through all the armature laminae to assist in the dissipation of heat therefrom and to avoid using laminae of different types in different parts of the core.

It is therefore an object of the present invention to provide an improved armature core for a dynamoelectric machine in which eddy currents produced by fringing flux are reduced without substantially affecting the air gap flux.

Another object of the present invention is to provide an improved armature core for a dynamoelectric machine in which eddy currents produced by fringing flux are reduced by dividing the armature into laminae all having the same diameter at the air gap.

Another object of the present invention is to provide an improved armature core for a dynamoelectric machine in which eddy currents produced by fringing flux are reduced by dividing the core into laminae which are all identical.

Another object of the present invention is to provide an improved armature core for a dynamoelectric machine in which the means for reducing the eddy currents produced by fringing flux also contribute to the dissipation of heat from the armature.

Objects and advantages other than those above set forth will be apparent from the following description when read in connection with the accompanying drawing, in which.

Figure 1:
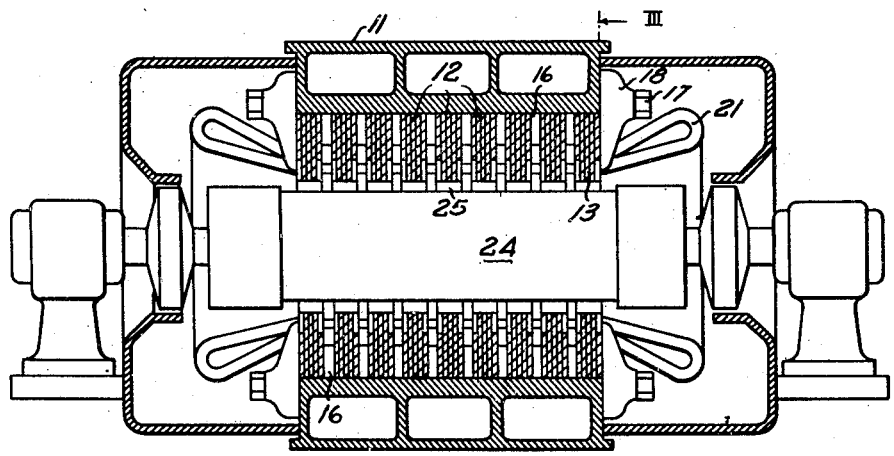
Fig. 1 is a view in axial cross section through a synchronous alternating current machine embodying the present invention.

Referring more particularly to the drawing by characters of reference, numeral 11 designates the casing of an alternating current dynamoelectric machine of the synchronous type. The casing supports the field and armature structures of the machine and it is assumed that the armature is the stationary element of the machine, the core 12 of which consists of a plurality of stacks 13 of insulated magnetic laminae. The different stacks are separated by spacers 14 to define ducts 16 for the flow of cooling medium such as air. The stacks and spacers are pressed together by bolts 17 through finger plates 18, which may also be backed with insulating material. The armature may however also be the rotating element of the machine, particularly in machines of the direct current type.

Figure 3:
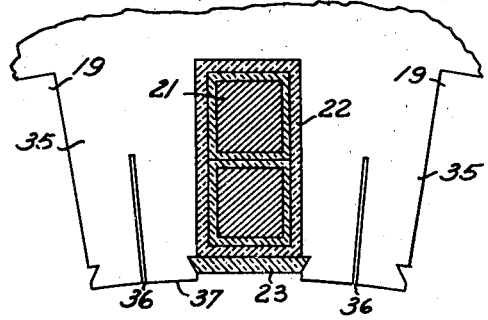
Fig. 3 is a partial view in transverse cross section taken adjacent the end armature laminae along line III—III in Fig. 1.

As shown in Fig. 3 the laminae are usually provided with slots 19 for the insertion thereof of the induced winding 21. The induced winding is provided with insulation 22 which may be damaged by heating above a predetermined temperature, and the winding is held in the slots by means of wedges 23 of insulating material which are likewise subject to damage by overheating.

Figure 2:
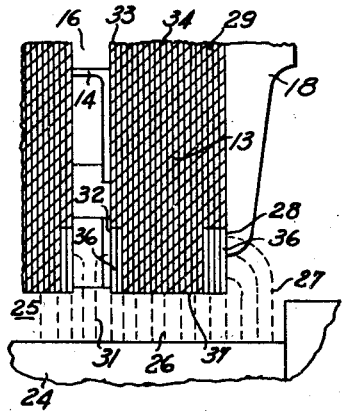
Fig. 2 is an enlarged view of a portion of Fig. 1 showing the end laminae of the armature core.

The field member 24 of the machine is rotatably supported in casing 11 and cooperates with core 12 to define an air gap 25 extending over the length of the different stacks 13. Field member 24 is however preferably made longer than core 12 to accommodate the end portions of the field winding while maintaining the air gap flux of substantially uniform intensity over the entire length of the air gap. The result thereof is that the air gap flux, conventionally indicated by dotted lines 26 in Fig. 2, is accompanied at both ends of the armature by a considerable fringing flux similarly indicated at 27. The fringing flux extends radially from the surface of field structure 24 and enters the end surfaces 28 of core 12 perpendicularly thereto, that is, in the axial direction. From each end surface 28 of the core the path of the fringing flux generally changes from the axial direction to the radial direction through a stack of end laminae 29, or through a single end lamina if the laminae are relatively thick.

Likewise another fringing flux 31 extends from the surface of field structure 24 to the end surfaces 32 of stacks 13 defining ducts 16. The path of flux 31 also changes from the axial direction to the radial direction through another stack of end laminae 33. Because ventilating ducts 16 are relatively narrow, however, the fringing flux in the ducts is relatively unimportant compared to the fringing flux at the ends of the core. The intermediate laminae 34 of each stack 13 carry only air gap flux, which has no component in the axial direction.

When the portion of the armature laminae adjacent the air gap surface of the armature core is provided with slots 19 defining teeth 35 as shown in Fig. 3, the greatest portion of the fringing flux enters core 12 through the end surfaces of the tip portions of the teeth. As the fringing flux is periodic an electromotive force is induced thereby in laminae 29, 33. The induced electromotive force is directed in the plane of the laminae and causes the flow of eddy currents therein. The eddy currents have their greatest intensity in the tip portion of the teeth where they follow closely the contour of the teeth as a result of so-called skin effect.

To reduce the magnitude of the eddy currents without substantially affecting the reluctance of core 12 for the air gap flux, the end lamina adjacent surface 28 or, preferably, all laminae 29 are provided with substantially radial narrow slots 36 extending to the air gap surfaces 37 of the laminae. Slots 36 do not appreciably affect the magnitude or distribution of the fringing flux and therefore do not appreciably affect the electromotive force induced by the fringing flux in end laminae 29. Since, however, the eddy currents resulting from the induced electromotive force follow the contour of the teeth, slots 36 lengthen the path of the eddy currents and thereby increase the impedance of such path. As is well known, when an electric circuit is subjected to a substantially constant electromotive force and its impedance is increased, the flow of current through the circuit is reduced to a certain extent and the dissipation of heat caused by such current is reduced to a considerably greater extent. Slots 36 therefore cause a certain reduction in the intensity of the eddy currents in laminae 29 and a greater reduction in the amount of heat evolved in laminae 29 by the flow of the eddy currents therein. As shown in Fig. 2, laminae 33 may likewise be provided with slots 36 to reduce the eddy currents produced by fringing flux 31.

Slots 36 are preferably made as narrow as practical to avoid appreciably reducing the cross section of teeth 35 for the air gap flux, but any contact between the edges of the slots must be avoided to force the eddy currents to flow around the slots. Maximum effectiveness of the slots is obtained when the slots extend at least as far as the fringing flux in the axial direction. As the fringing flux enters mostly the tip portion of teeth 35 and rapidly decreases in density toward the root of the teeth, slots 36 may be made considerably shorter than the teeth without appreciably reducing their effectiveness.

Figure 4:
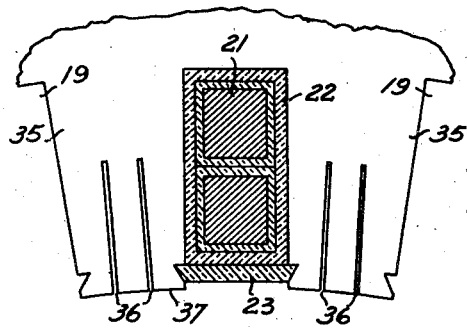
Fig. 4 is a view similar to Fig. 3 of a modified embodiment of the present invention.

As shown in Fig. 4, each tooth may be provided with a plurality of slots. The effects of the individual slots are substantially additive provided that sufficient metal is available between adjacent slots and between the slots and the edges of the teeth for the flow of substantially the entire eddy currents along the edges of the slots.

Figures 5, 6:
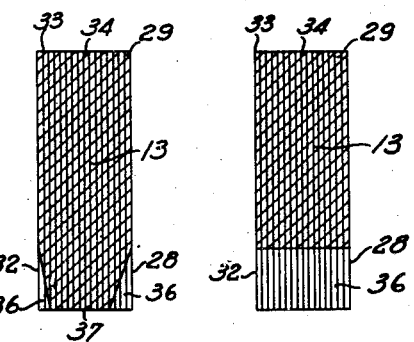
Fig. 5 is a view similar to Fig. 2 through a stack of laminae provided with slots of gradually decreasing depth.
Fig. 6 is a view similar to Fig. 2 through a stack of laminae provided with slots extending through the thickness of the stack.

Because of the gradual change in the direction of the fringing flux through the laminae, the eddy currents are of greatest intensity at the end surfaces 28, 32 of the core stacks and gradually decrease in intensity in the different laminae 29, 33 in the direction toward intermediate laminae 34. As shown in Fig. 5 slots 36 may therefore be made of decreasing depth through laminae 29 and also through laminae 33.

In order to simplify the construction of core 12, slots 36 may also be extended with a uniform depth through the end stacks 13, as shown in Fig. 6, or even through the entire core. The slots then cooperate with ducts 16 in dissipating the heat generated in the core and in winding 21 during operation of the machine.

Although but a few embodiments of the present invention have been illustrated and described, it will be apparent to one skilled in the art that various changes and modifications may be made therein without departing from the spirit of the invention or from the scope of the appended claims.

It is claimed and described to secure by Letters Patent:

1. A cylindrical armature core member for a dynamoelectric machine comprising a stack of magnetic laminae extending transversely to the axis of said member, the portions of said laminae adjacent the air gap surface of said member being provided with slots for insertion of an induced winding, said slots defining a plurality of teeth extending to the air gap of said machine, the fringing flux of said machine entering the end surfaces of the tip portions of said teeth to produce eddy currents therein, said teeth being provided with substantially radial narrow slots extending through said tip portions to said air gap for reducing said eddy currents while leaving substantially unaffected the reluctance of said teeth for the flux entering the air gap surfaces thereof.

2. A cylindrical armature core member for a dynamoelectric machine comprising a stack of magnetic laminae extending transversely to the axis of said member, the portions of said laminae adjacent the air gap surface of said member being provided with slots for insertion of an induced winding, said slots defining a plurality of teeth extending to the air gap of said machine, said stack comprising an end-lamina wherein eddy currents are produced by the fringing flux entering said lamina through the end surface thereof, each said tooth of said end lamina being provided with a plurality of substantially radial narrow slots extending to said air gap.

3. A cylindrical armature core member for a dynamoelectric machine comprising a stack of magnetic laminae extending transversely to the axis of said member, said laminae being provided with a plurality of substantially radial narrow slots of substantially uniform width extending to the air gap surface of said laminae for reducing the eddy currents produced in said stack by fringing flux entering said stack through the end surfaces thereof while leaving substantially unaffected the reluctance of said stack for the flux entering the air gap surface of said stack, the depth of said slots decreasing from said end surfaces toward the central portion of said stack.

4. A dynamoelectric machine comprising a cylindrical field member and a cylindrical armature core member rotatable with respect to each other and defining a cylindrical air gap, said field member being longer than said armature member to produce a substantially uniform radial magnetic field in said air gap and a fringing field entering the end surfaces of said armature member, said armature member being divided into a plurality of laminae including two stacks of end laminae and a stack of intermediate laminae, only said end laminae being provided with a plurality of substantially radial narrow slots of substantially uniform width extending to said air gap for reducing the eddy currents produced in said end laminae by said fringing field.

5. A dynamoelectric machine comprising a cylindrical field member and a cylindrical armature core rotatable with respect to each other and defining a cylindrical air gap, said field member producing a magnetic field extending radially through said air gap, said core being divided into transverse laminae for reducing the magnitude of eddy currents produced in said core by said radial field, the portions of said laminae adjacent the air gap surface of said member being provided with slots for insertion of an induced winding, said slots defining a plurality of teeth extending to the air gap of said machine, said laminae comprising an end lamina wherein eddy currents are produced by the fringing flux entering said end lamina through the end surface thereof, the teeth of said end lamina being provided with substantially radial narrow slots extending to said air gap for reducing the eddy currents produced in said end lamina by said fringing flux while leaving the reluctance of said end lamina for said radial field substantially unaffected.

6. A cylindrical armature core member for a dynamoelectric machine comprising magnetic laminae extending transversely to the axis of said member and comprising intermediate laminae and a stack of end laminae wherein eddy currents are produced by the fringing flux entering said end laminae through the end surface thereof, only said end laminae being provided with a plurality of substantially radial narrow slots extending to the air gap surface of said end laminae for reducing the eddy currents produced in said end laminae by said fringing flux while leaving substantially unaffected the reluctance of said end laminae for the flux entering the air gap surface of said end laminae.

7. A cylindrical armature core member for a dynamoelectric machine comprising a stack of magnetic laminae extending transversely to the axis of said member, one end of said stack being provided with a plurality of substantially radial narrow slots extending to the air gap surface of said laminae for reducing the eddy currents produced in said stack by fringing flux entering said stack through an end surface thereof while leaving substantially unaffected the reluctance of said stack for the flux entering the air gap surface of said stack, the depth of said slots decreasing from said end surface toward the central portion of said stack.

8. A cylindrical armature core member for a dynamoelectric machine comprising a stack of magnetic laminae extending transversely to the axis of said member, the portions of said laminae adjacent the air gap surface of said member being provided with slots for insertion of an induced winding, said slots defining a plurality of teeth extending to the air gap of said machine, said stack comprising an end lamina wherein eddy currents are produced by the fringing flux entering said end lamina through the end surface thereof, each said tooth of said end lamina being provided with a substantially radial narrow slot extending to said air gap for reducing the eddy currents produced in said end lamina by fringing flux entering said teeth through the end surfaces thereof while leaving substantially unaffected the reluctance of said teeth for the flux entering the air gap surfaces thereof.

WILLIAM L. RINGLAND.

REFERENCES CITED

The following references are of record in the file of this patent:

UNITED STATES PATENTS

| Number | Name | Date |
| --- | --- | --- |
| 923,614 | Behrend | June 1, 1909 |
| 1,126,363 | Bliss | Jan. 26, 1915 |
| 1,689,188 | Pohl | Oct. 23, 1928 |